(12) United States Patent
Son et al.

(10) Patent No.: US 9,298,043 B2
(45) Date of Patent: Mar. 29, 2016

(54) LIQUID CRYSTAL DISPLAY

(71) Applicant: Samsung Display Co., Ltd., Yongin, Gyeonggi-Do (KR)

(72) Inventors: Jong Ho Son, Seoul (KR); Min-Jae Kim, Suwon-si (KR); Min-Hee Kim, Ansan-si (KR); Joon-Hyung Park, Seoul (KR); Keun Chan Oh, Cheonan-si (KR); Kyung Hee Lee, Suwon-si (KR); Kang Seob Jeong, Seongnam-si (KR); Kyung Seon Tak, Hwaseong-si (KR); Sung Hwan Hong, Suwon-si (KR)

(73) Assignee: Samsung Display Co., Ltd. (KR)

( * ) Notice: Subject to any disclaimer, the term of this patent is extended or adjusted under 35 U.S.C. 154(b) by 15 days.

(21) Appl. No.: 14/444,807

(22) Filed: Jul. 28, 2014

(65) Prior Publication Data

US 2015/0103299 A1    Apr. 16, 2015

(30) Foreign Application Priority Data

Oct. 15, 2013 (KR) .................. 10-2013-0122829

(51) Int. Cl.
  *G02F 1/1333* (2006.01)
  *G02F 1/1337* (2006.01)
  *G02F 1/1334* (2006.01)
  *G02F 1/1343* (2006.01)

(52) U.S. Cl.
  CPC ........ *G02F 1/133711* (2013.01); *G02F 1/1334* (2013.01); *G02F 1/133753* (2013.01); *G02F 1/133788* (2013.01); *G02F 2001/133761* (2013.01); *G02F 2001/134345* (2013.01)

(58) Field of Classification Search
  CPC .................. G02F 1/1334; G02F 1/133788
  See application file for complete search history.

(56) References Cited

U.S. PATENT DOCUMENTS

| 7,298,449 | B2 | 11/2007 | Tatemura et al. |
|---|---|---|---|
| 7,859,623 | B2 | 12/2010 | Ahn |
| 8,355,110 | B2 | 1/2013 | Kim et al. |
| 2011/0256393 | A1 | 10/2011 | Arai et al. |
| 2013/0033664 | A1 | 2/2013 | Lee et al. |
| 2013/0114012 | A1 | 5/2013 | Liu et al. |

FOREIGN PATENT DOCUMENTS

| JP | 3714796 | 9/2005 |
|---|---|---|
| KR | 1020090058119 A | 6/2009 |
| KR | 1020110006220 A | 1/2011 |

OTHER PUBLICATIONS

Mizusaki et al; "Analysis of Polymerization with Photo-Fries Rearrangement in Liquid Crystal Displays"; Journal of Appliend Physics; 113,174502, http://jap.aip.org/resource/1/JAPAIU/v113/i17, 2013.

*Primary Examiner* — Phu Vu
(74) *Attorney, Agent, or Firm* — Innovation Counsel LLP

(57) ABSTRACT

A liquid crystal display includes: a first substrate, a plurality of pixel electrodes disposed on the first substrate and including a first subpixel electrode and a second subpixel electrode including a cross stem and a plurality of minute branches extending from the cross stem; a second substrate facing the first substrate; a first alignment layer disposed on the first substrate and the pixel electrode; a second alignment layer disposed on an inner surface of the second substrate; and a liquid crystal layer injected between the first substrate and the second substrate and including a prepolymer, a reaction initiator, and a polymerization reactor, of which a content of the reaction initiator is higher than a content of the polymerization reactor.

20 Claims, 6 Drawing Sheets

LIQUID CRYSTAL DISPLAY

CROSS-REFERENCE TO RELATED APPLICATION

This application claims priority to and the benefit of Korean Patent Application No. 10-2013-0122829 filed in the Korean Intellectual Property Office on Oct. 15, 2013, the entire contents of which are incorporated herein by reference.

BACKGROUND (a) Field

The present invention relates to a liquid crystal display.

(b) Description of the Related Art

A liquid crystal display is a type of flat panel displays that is widely used. The liquid crystal display includes two display panel sheets in which field generating electrodes such as pixel electrodes and common electrodes are formed, and a liquid crystal layer interposed between the display panels. In the liquid crystal display, a voltage is applied to the field generating electrodes to generate an electric field in the liquid crystal layer, which determines the direction of liquid crystal molecules of the liquid crystal layer, and an image is displayed by controlling the polarization of incident light.

Among the different types of liquid crystal displays, a vertical alignment (VA) mode liquid crystal display, which aligns liquid crystal molecules such that their long axes are perpendicular to the panels in the absence of an electric field, is spotlighted because of its high contrast ratio and wide reference viewing angle.

In the vertical alignment (VA) mode liquid crystal display, the wide reference viewing angle can be realized by forming a plurality of domains including liquid crystal of different alignment directions in one pixel.

Methods in which a minute slit or an opening is formed in the field generating electrodes or a protrusion is formed on the field generating electrodes have been proposed as means for forming the plurality of domains in one pixel. In this method, the plurality of domains may be formed by aligning the liquid crystal molecules vertically with respect to a fringe field generated between the edges of the opening or the protrusion and the field generating electrodes facing the edges.

On the other hand, the liquid crystal display of the vertical alignment (VA) mode has lower side visibility compared with front visibility. To solve this problem one pixel is divided into two subpixels and different voltages are applied to the subpixels.

The above information disclosed in this Background section is only for enhancement of understanding of the background of the disclosure and therefore it may contain information that does not form the prior art that is already known to a person of ordinary skill in the art.

SUMMARY

A liquid crystal display having excellent display quality that is improved in terms of a circumference stain phenomenon generated at a circumference of a liquid crystal by increasing an amount of a reaction initiator of a prepolymer material in a liquid crystal composition of the liquid crystal display is provided.

A liquid crystal display includes: a first substrate; a plurality of pixel electrodes disposed on the first substrate and including a first subpixel electrode and a second subpixel electrode including a cross stem and a plurality of minute branches extending from the cross stem; a second substrate facing the first substrate; a first alignment layer disposed on the first substrate and the pixel electrode; a second alignment layer disposed on an inner surface of the second substrate; and a liquid crystal layer injected between the first substrate and the second substrate and including a prepolymer, a reaction initiator, and a polymerization reactor, in which a content of the reaction initiator is higher than a content of the polymerization reactor.

The reaction initiator may have a function of initiating polymerization of the prepolymer.

The polymerization reactor may have a function of performing polymerization of the prepolymer in which the polymerization is initiated.

The prepolymer may be a reactive mesogen.

The reaction initiator may be an aryl ester group.

The polymerization reactor may be an acrylate group or a methacrylate group.

The prepolymer may be 0.1-0.5 wt % of a total weight of the liquid crystal layer.

The pixel electrode may be divided into four subregions by the cross stem.

The minute branches of each subregion may extend in different directions.

The minute branches of the adjacent subregions may be orthogonal.

A width of the minute branches may be in a range of 2.5 µm to 5.0 µm.

The width of the minute branches may become wider closer to the cross stem.

A difference between a portion where the width of the minute branches is wide and a portion where the width may be narrow is 0.2 µm to 1.5 µm.

A manufacturing method of a liquid crystal display according to another example embodiment of the present invention includes: forming a plurality of pixel electrodes including a first subpixel electrode and a second subpixel electrode formed with a cross stem and a plurality of minute branches extending from the cross stem on a first substrate; forming a second substrate facing the first substrate; forming a first alignment layer on the first substrate; forming a second alignment layer on the second substrate; injecting a liquid crystal layer including a prepolymer having a reaction initiator group and a polymerization reactor group, in which a content of the reaction initiator group is higher than that of the polymerization reactor group in a total liquid crystal composition between the first substrate and the second substrate; applying an electric field to the pixel electrode and the common electrode; and irradiating light to the liquid crystal layer to transform the prepolymer into a polymer.

As described above, the liquid crystal display increases the amount of the reaction initiator of the prepolymer material in the liquid crystal composition, and in detail, increases the content of the reaction initiator compared with the amount of the polymerization reactor propagating the polymerization of the prepolymer of the liquid crystal composition such that the circumference stain phenomenon that may be generated at the circumference portion of the liquid crystal may be improved.

DETAILED DESCRIPTION OF THE EMBODIMENTS

Figure 1:
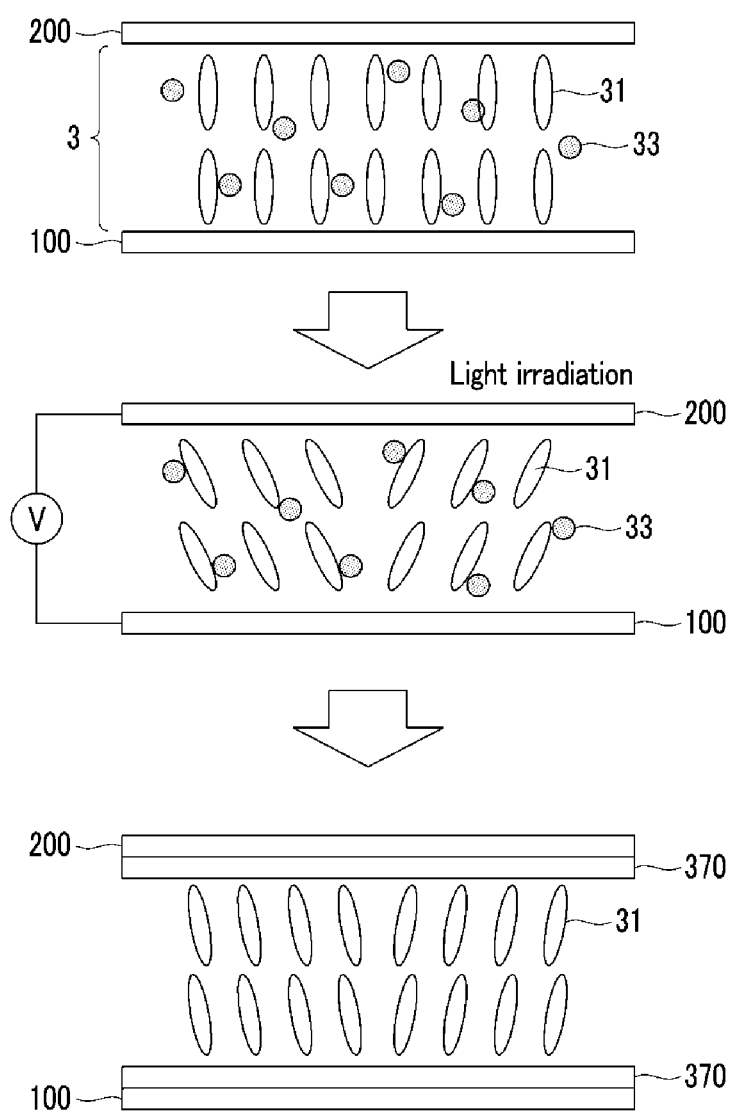
FIG. 1 is a view showing a process of providing a pretilt angle to liquid crystal molecules by using a prepolymer that is polarized by light such as ultraviolet rays.

The example embodiments will be described more fully hereinafter with reference to the accompanying drawings, in which example embodiments are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

An initial alignment method of providing the pretilt angle to the liquid crystal molecules of the liquid crystal layer will be described with reference to FIG. 1 and FIG. 2.

FIG. 1 is a view showing a process of providing a pretilt angle to liquid crystal molecules by using a prepolymer that is polarized by light such as ultraviolet rays. FIG. 2 is a view of a molecular structure of a prepolymer included in a liquid crystal layer of a liquid crystal display according to an example embodiment.

Prepolymer 33, which may be, for example, a monomer that is polymerized by light such as ultraviolet rays, is injected along with a liquid crystal material between two display panels 100 and 200. The prepolymer 33 may be a reactive mesogen that is polymerized by light such as ultraviolet rays.

The prepolymer 33 may be included at 0.1-0.5 wt % of a total weight of a liquid crystal composition.

Figure 6:
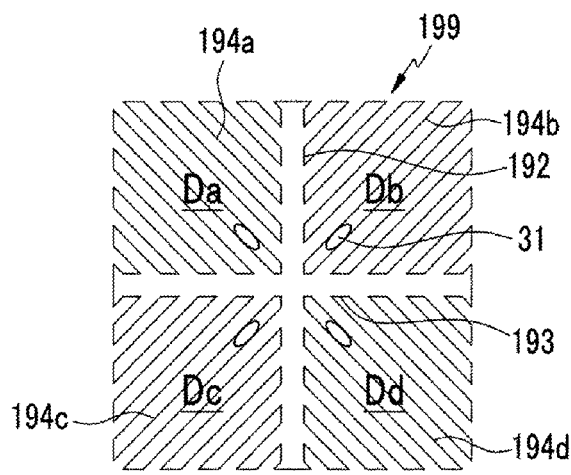
FIG. 6 is a view of a basic structure of the pixel of FIG. 4.

Next, an electric field is generated across the liquid crystal layer 3. For example, a first subpixel electrode 191a and a second subpixel electrode 191b, which are formed on lower panel 100 (as described below with respect to FIG. 4) are applied with a data voltage, and a common voltage is applied to a common electrode 270 which is formed on the upper panel 200 (FIG. 4) to generate the electric field across a liquid crystal layer 3 between the two display panels 100 and 200. Thus, as shown in FIG. 6, liquid crystal molecules 31 of the liquid crystal layer 3 are inclined in the direction that is parallel to the length direction of minute branches 194a, 194b, 194c, and 194d through two steps as described above in response to the electric field, and the liquid crystal molecules 31 in one pixel PX are inclined in a total of four directions.

After generating the electric field across the liquid crystal layer 3, if the liquid crystal layer 3 is irradiated with light, such as with ultraviolet rays, the prepolymer 33 monomers are polymerized to form polymers 370, as shown in FIG. 1. The polymers 370 are formed while contacting the display panels 100 and 200. The alignment direction of the liquid crystal molecules 31 is determined to have the pretilt angle in the directions described above. Accordingly, even when a voltage is not applied to the electrodes 191 and 270, the liquid crystal molecules 31 are arranged with the pretilt angle in the four different directions.

A circumference portion (a bezel) of the liquid crystal display often includes a sealant. Such a sealant may emit an impurity as a result of a portion of the sealant remaining uncured, and the uncured sealant impurity may become mixed with the liquid crystal composition near the circumference portion (a bezel) of the liquid crystal display. The sealant composition impurity generally includes a photo-initiator.

Due to the photo-initiator, the liquid crystal molecules 31 near the circumference portion of the liquid crystal display have an excessive pretilt angle as compared with the liquid crystal molecules 31 of a center portion of the display device such that a stain appears at the circumference portion of the display device.

To minimize the influence of the photo-initiator included in the sealant impurity, a reaction initiator that is use for initiating the reaction of the prepolymer 33 and a polymerization reactor that is used for propagating the polymerization of the prepolymer 33 once the polymerization has been initiated are both included in the liquid crystal layer 3. The amount of reaction initiator having the initiation function of the reaction included in the liquid crystal layer 3 is larger than the amount of the polymerization reactor propagating the polymerization of the prepolymer 33 included in the liquid crystal layer 3, thereby minimizing the influence of the photo-initiator entering the liquid crystal layer 3 as an impurity of the sealant composition.

The reaction initiator of the prepolymer 33 may be, for example, an aryl ester group. The polymerization reactor propagating to the polymerization may be, for example, an acrylate group or a methacrylate group, however they are not limited thereto.

In this case, a compound including the aryl ester group as the reaction initiator may be additionally included in the liquid crystal composition.

Figure 2:
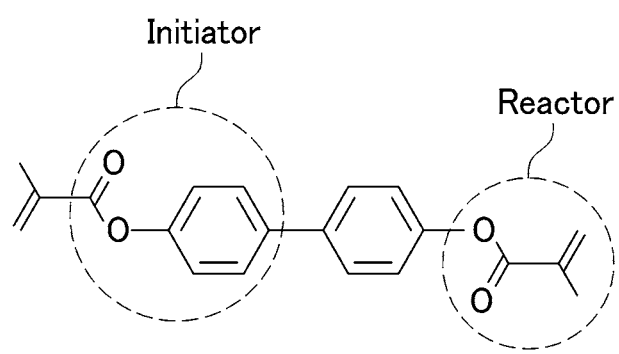
FIG. 2 is a view of a molecular structure of a prepolymer included in a liquid crystal layer of a liquid crystal display according to an example embodiment.

FIG. 2 shows the molecular structure as one kind of the reactive mesogen, and referring to FIG. 2, a part of the structure having the aryl ester group becomes the reaction initiator of the prepolymer 33, while a part having the acrylate group becomes the polymerization reactor propagating the polymerization of the prepolymer.

The content of the aryl ester group as the added reaction initiator must be larger than the content of the acrylate or methacrylate corresponding to the polymerization reactor propagating the polymerization in the total content of the liquid crystal composition.

Next, an arrangement and a driving method of the signal line and the pixel of a liquid crystal display according to an example embodiment will be described with reference to FIG. 3.

Figure 3:
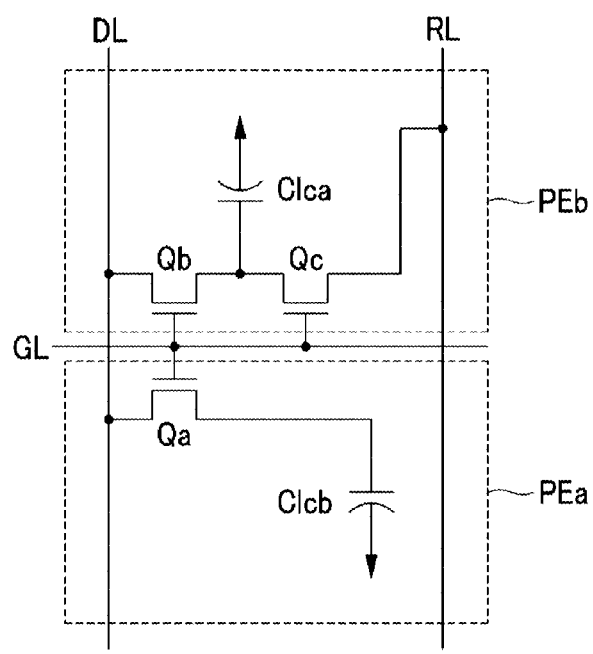
FIG. 3 is an equivalent circuit diagram of one pixel of a liquid crystal display according to an example embodiment.

FIG. 3 is an equivalent circuit diagram of one pixel of a liquid crystal display according to an example embodiment of the present invention.

Referring to FIG. 3, one pixel of the liquid crystal display according to the present example embodiment includes a gate line GL transmitting a gate signal, a data line DL transmitting a data signal, a plurality of signal lines including a divided voltage reference voltage line RL transmitting a divided voltage reference voltage, first, second, and third switching elements Qa, Qb, and Qc connected to the plurality of signal lines, and first and second liquid crystal capacitors Clca and Clcb.

The first and second switching elements Qa and Qb are connected to the gate line GL and the data line DL, respectively, and the third switching element Qc is connected to an output terminal of the second switching element Qb and the divided voltage reference voltage line RL.

The first switching element Qa and the second switching element Qb correspond to a three terminal element such as a thin film transistor, and a control terminal thereof is connected to the gate line GL, an input terminal is connected to the data line DL, an output terminal of the first switching element Qa is connected to the first liquid crystal capacitor Clca, and an output terminal of the second switching element Qb is connected to the second liquid crystal capacitor Clcb and an input terminal of the third switching element Qc.

The third switching element Qc also corresponds to the three terminal element such as the thin film transistor, and a control terminal is connected to the gate line GL, an input terminal is connected to the second liquid crystal capacitor Clcb, and an output terminal is connected to the divided voltage reference voltage line RL.

If a gate-on signal is applied to the gate line GL, the first switching element Qa, the second switching element Qb, and the third switching element Qc connected to the gate line GL are turned on. Accordingly, data voltages applied to the data line DL are applied to a first sub-pixel electrode PEa and a second sub-pixel electrode PEb through the turned on first switching element Qa and second switching element Qb. At this time, the data voltages applied to the first sub-pixel electrode PEa and the second sub-pixel electrode PEb are the same, and the first liquid crystal capacitor Clca and the second liquid crystal capacitor Clcb are charged with the same voltage value corresponding to a difference between a common voltage and the data voltage. Simultaneously, the voltage charged in the second liquid crystal capacitor Clcb is divided through the turned on third switching element Qc. Accordingly, a voltage value charged in the second liquid crystal capacitor Clcb is lowered by a difference between the common voltage and a divided voltage reference voltage. That is, the voltage charged in the first liquid crystal capacitor Clca is higher than the voltage charged in the second liquid crystal capacitor Clcb.

As described above, the voltage charged in the first liquid crystal capacitor Clca and the voltage charged in the second liquid crystal capacitor Clcb become different from each other. Because the voltage of the first liquid crystal capacitor Clca and the voltage of the second liquid crystal capacitor Clcb are different from each other, inclined angles of liquid crystal molecules in the first sub-pixel and the second sub-pixels become different, and thus luminance of the two sub-pixels becomes different. Accordingly, by properly controlling the voltage of the first liquid crystal capacitor Clca and the voltage of the second liquid crystal capacitor Clcb, an image viewed from the side may become closest to an image viewed from the front, thereby increasing the visibility at the side.

In the shown example embodiment, although the third switching element Qc connected to the second liquid crystal capacitor Clcb and the divided voltage reference voltage line RL is included to make the voltage charged in the first liquid crystal capacitor Clca and the voltage charged in the second liquid crystal capacitor Clcb different from each other, the second liquid crystal capacitor Clcb may be connected to a step-down capacitor in a liquid crystal display according to another example embodiment. Specifically, the voltage charged in the first liquid crystal capacitor Clca and the voltage charged in the second liquid crystal capacitor Clcb may be differently set by including the third switching element including a first terminal connected to a step-down gate line, a second terminal connected to the second liquid crystal capacitor Clcb, and a third terminal connected to the step-down capacitor, and charging a part of charge amounts charged in the second liquid crystal capacitor Clcb to the step-down capacitor. Further, in a liquid crystal display according to another example embodiment, the voltage charged in the first liquid crystal capacitor Clca and the voltage charged in the second liquid crystal capacitor Clcb may be differently set by connecting the first liquid crystal capacitor Clca and the second liquid crystal capacitor Clcb to different data lines to receive different data voltages. In addition, the voltage charged in the first liquid crystal capacitor Clca and the voltage charged in the second liquid crystal capacitor Clcb may be differently set through various other methods.

Figure 4:
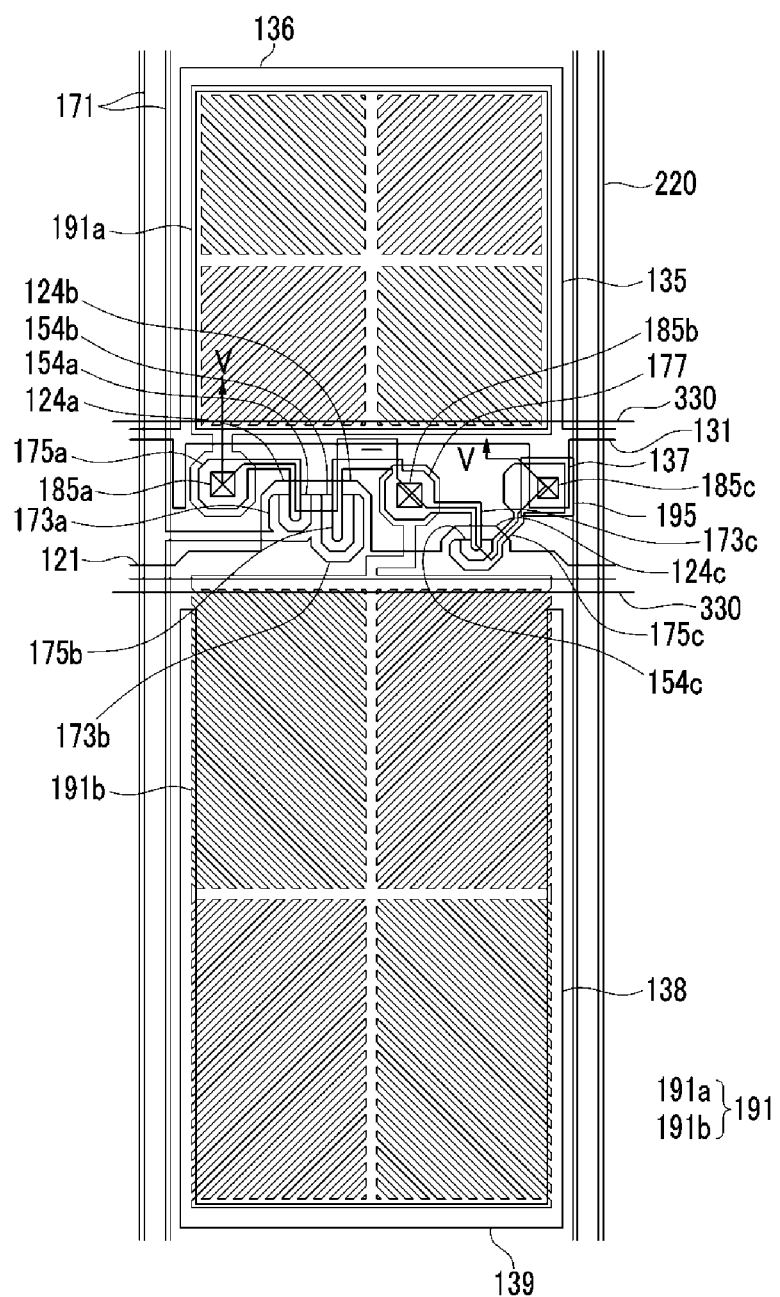
FIG. 4 is a layout view of one pixel of a liquid crystal display according to an example embodiment.
Figure 5:
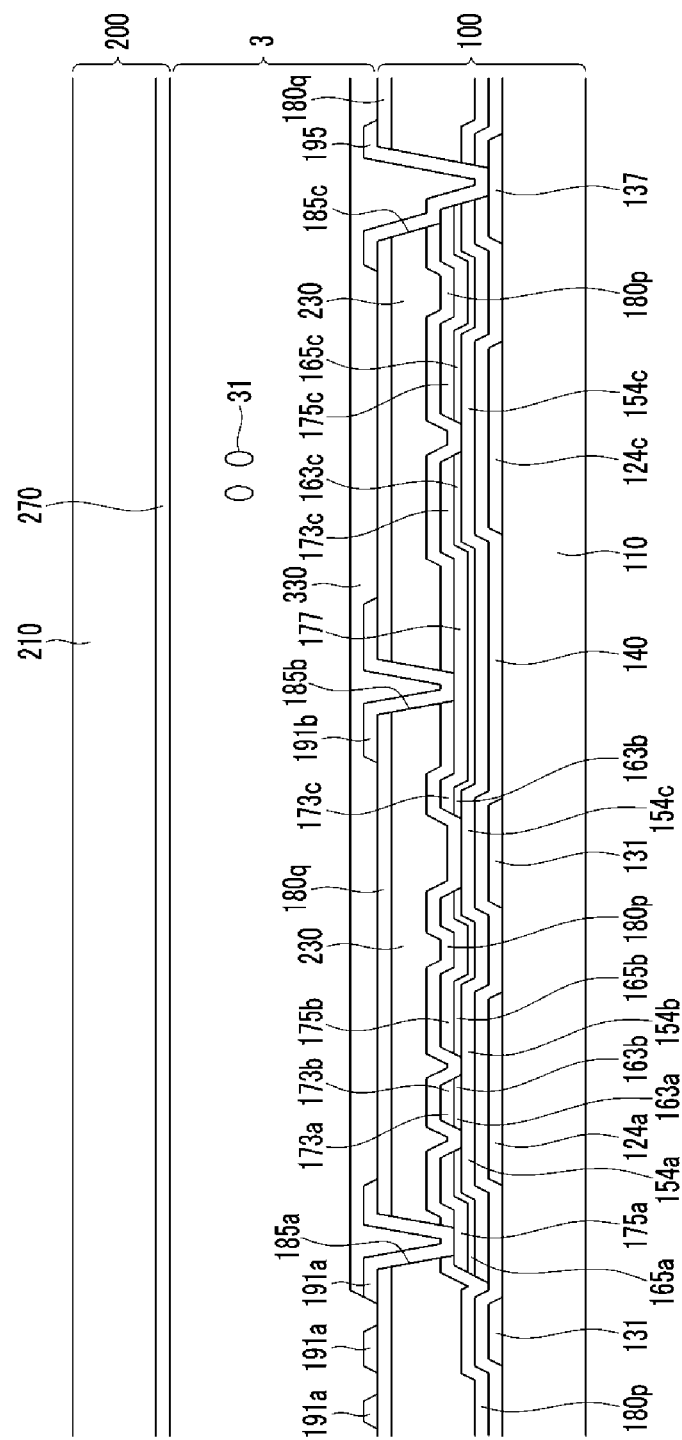
FIG. 5 is a cross-sectional view taken along the line V-V of FIG. 4.

Now, a structure of the liquid crystal display according to the example embodiment illustrated in FIG. 3 will be briefly described with reference to FIGS. 4 to 6. FIG. 4 is a layout view of one pixel of a liquid crystal display according to an example embodiment, and FIG. 5 is a cross-sectional view taken along the line V-V of FIG. 4. FIG. 6 is a top plan view of a basic region of a pixel electrode of a liquid crystal display according to an example embodiment.

Referring to FIG. 4 and FIG. 5, the liquid crystal display according to the present example embodiment includes the lower display panel 100 and the upper display panel 200 which face each other, the liquid crystal layer 3 between the two display panels 100 and 200, and a pair of polarizers (not shown) respectively attached to outer surfaces of the displays panels 100 and 200.

The lower display panel 100 will be described first.

A gate conductor including a gate line 121 and a divided voltage reference voltage line 131 is formed on an insulation substrate 110 formed of transparent glass or plastic.

The gate line 121 includes a first gate electrode 124a, a second gate electrode 124b, a third gate electrode 124c, and a wide end (not shown) for connection with another layer or an external driving circuit.

The divided voltage reference voltage line 131 includes first storage electrodes 135 and 136, and a reference electrode 137. Second storage electrodes 138 and 139 that are not connected to the divided voltage reference voltage line 131, but overlap the second subpixel electrode 191b, are also positioned.

A gate insulating layer 140 is formed on the gate line 121 and the divided voltage reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor including a plurality of data lines including a first source electrode 173a and a second source electrode 173b, a first drain electrode 175a, a second drain electrode 175b, a third source electrode 173c, and a third drain electrode 175c is formed on the ohmic contacts 163a, 165a, 163b, 165b, 163c, and 165c and the gate insulating layer 140.

The data conductor, and the semiconductor and the ohmic contact which are located below the data conductor may be simultaneously formed using one mask.

The data line 171 includes a wide end (not shown) for connection with another layer or an external driving circuit.

The first gate electrode 124a, the first source electrode 173a, and the first drain electrode 175a form one first thin film transistor (TFT) Qa together with the first semiconductor 154a, and a channel of the thin film transistor is formed on the first semiconductor 154a between the first source electrode 173a and the first drain electrode 175a. Likewise, the second gate electrode 124b, the second source electrode 173b, and the second drain electrode 175b form one second thin film transistor Qb together with the second semiconductor 154b, and a channel is formed on the second semiconductor 154b between the second source electrode 173b and the second drain electrode 175b, while the third gate electrode 124c, the third source electrode 173c, and the third drain electrode 175c form one third thin film transistor Qc together with the third semiconductor 154c, and a channel is formed on the third semiconductor 154c between the third source electrode 173c and the third drain electrode 175c.

The second drain electrode 175b is connected with the third source electrode 173c and includes an extension 177 which widely expands.

A first passivation layer 180p is formed on the data conductors 171, 173c, 175a, 175b, and 175c and the exposed portion of the semiconductors 154a, 154b, and 154c. The first passivation layer 180p may include an inorganic insulating layer such as a silicon nitride or silicon oxide. The first passivation layer 180p prevents the pigment of the color filter 230 from flowing into the exposed portion of the semiconductors 154a, 154b, and 154c.

A color filter 230 is formed on the first passivation layer 180p. The color filter 230 extends along two adjacent data lines in the vertical direction. A first light blocking member 220 is positioned on the first passivation layer 180p, the edge of the color filter 230, and the data line 171.

The first light blocking member 220 extends along the data line 171 and is positioned between two adjacent color filters 230. A width of the first light blocking member 220 may be larger than a width of the data line 171. As described above, by forming the first light blocking member 220 to have the wider width in comparison with the data line 171, the first light blocking member 220 may prevent light incident from the outside from being reflected from the surface of the data line 171 of the metal. Accordingly, the light reflected from the surface of the data line 171 disturbs the light passing through the liquid crystal layer 3, thereby preventing the contrast ratio of the liquid crystal display from being deteriorated.

A second passivation layer 180q is formed on the color filter 230 and the first light blocking member 230.

The second passivation layer 180q may include an inorganic insulating layer made of a silicon nitride, a silicon oxide, or the like. The second passivation layer 180q prevents the color filter 230 from being lifted, and suppresses contamination of the liquid crystal layer 3 by an organic material such as a solvent flowing in from the color filter 230 to prevent defects such as an afterimage which may be caused when a screen is driven.

The first passivation layer 180p and the second passivation layer 180q have a first contact hole 185a and a second contact hole 185b exposing the first drain electrode 175a and the second drain electrode 175b.

The first passivation layer 180p, the second passivation layer 180q, and the gate insulating layer 140 have a third contact hole 185c exposing a portion of the reference electrode 137 and a portion of the third drain electrode 175c, and the third contact hole 185c is covered by a connecting member 195. The connecting member 195 electrically connects the reference electrode 137 and the third drain electrode 175c through the third contact hole 185c.

A plurality of pixel electrodes 191 are formed on the second passivation layer 180q. Each pixel electrode 191 includes a first subpixel electrode 191a and a second subpixel electrode 191b which are separated from each other with the gate line 121 therebetween to extend together in a column direction based on the gate line 121. The pixel electrode 191 may be made of a transparent material such as ITO or IZO. The pixel electrode 191 may be made of a transparent conductive material such as ITO or IZO, or a reflective metal such as aluminum, silver, chromium, or an alloy thereof.

The first subpixel electrode 191a and the second subpixel electrode 191b are respectively included in a basic electrode shown in FIG. 6, or at least one modification thereof.

The first subpixel electrode 191a and the second subpixel electrode 191b are physically and electrically connected to the first drain electrode 175a and the second drain electrode 175b through the first contact hole 185a and the second contact hole 185b, thereby respectively receiving data voltages from the first drain electrode 175a and the second drain electrode 175b. In this case, a part of the data voltage applied to the second drain electrode 175b is divided through the third source electrode 173c, and as a result, the magnitude of the voltage applied to the first subpixel electrode 191a is larger than the magnitude of the voltage applied to the second subpixel electrode 191b.

The first subpixel electrode 191a and the second subpixel electrode 191b to which the data voltages are applied generate an electric field together with the common electrode 270 of the upper panel 200 to determine directions of the liquid crystal molecules of the liquid crystal layer 3 between the two electrodes 191 and 270. Luminance of light passing through the liquid crystal layer 3 varies according to the determined directions of the liquid crystal molecules.

A second light blocking member 330 is positioned on the pixel electrode 191. The second light blocking member 330 is formed to cover all of the regions in which the first transistor Qa, the second transistor Qb, the third transistor Qc, and the first to third contact holes 185a, 185b, and 185c are positioned, and is extended in the same direction as that of the gate line 121 to be positioned so as to overlap the part of the data line 171. The second light blocking member 330 may be positioned to overlap at least a part of two data lines 171 positioned at respective sides of one pixel region, to prevent light leakage generable at the vicinity of the data line 171 and the gate line 121, and prevent light leakage in the regions in which the first transistor Qa, the second transistor Qb, and the third transistor Qc are positioned.

Before forming the second light blocking member 330, the first passivation layer 180p, the color filter 230, and the second passivation layer 180q are positioned within the regions in which the first transistor Qa, the second transistor Qb, the third transistor Qc, and the first to third contact holes 185a, 185b, and 185c are positioned so that the positions of the first transistor Qa, the second transistor Qb, the third transistor Qc, and the first to third contact holes 185a, 185b, and 185c may be easily discriminated.

Now, the upper display panel 200 will be described.

The common electrode 270 is formed on an insulation substrate 210. An upper alignment layer (not shown) may be formed on the common electrode 270. The upper alignment layer may be a vertical alignment layer.

The liquid crystal layer 3 has negative dielectric anisotropy, and liquid crystal molecules 31 of the liquid crystal layer 3 are aligned so that long axes of the liquid crystal molecules are perpendicular to the surfaces of the two display panels 100 and 200 in a state where there is no electric field.

Now, referring to FIG. 6, the basic electrode 199 will be described.

As shown in FIG. 6, the overall shape of the basic electrode 199 is a quadrangle, and includes a cross-shaped stem having a transverse stem 193 and a longitudinal stem 192 that are crossed. Also, the basic electrode 199 is divided into a first subregion Da, a second subregion Db, a third subregion Dc, and a fourth subregion Dd by the transverse stem 193 and the longitudinal stem 192, and the subregions Da-Dd respectively include a plurality of first to fourth minute branches 194a, 194b, 194c, and 194d.

The first minute branch 194a obliquely extends from the transverse stem 193 or the longitudinal stem 192 in the upper-left direction, and the second minute branch 194b obliquely extends from the transverse stem 193 or the longitudinal stem 192 in the upper-right direction. Also, the third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction.

The first to fourth minute branches 194a, 194b, 194c, and 194d form an angle of about 45 degrees or 135 degrees with the gate lines 121a and 121b or the transverse stem 193. Also, the minute branches 194a, 194b, 194c, and 194d of two neighboring subregions Da, Db, Dc, and Dd may be orthogonal.

The width of the minute branches 194a-194d may be in a range of 2.5 μm to 5.0 μm, and the interval between the neighboring minute branches 194a-194d in one of the subregions Da-Dd may be in a range of 2.5 μm to 5.0 μm.

In another example embodiment, the width of the minute branches 194a-194d may become wider closer to the transverse stem 193 or the longitudinal stem 192, and the difference between the widest width and the narrowest width in one of the minute branches 194a-194d may be in the range of 0.2 μm to 1.5 μm.

The first and second sub-pixel electrodes 191a and 191b are respectively connected to the first and second drain electrodes 175a and 175b through the contact holes 185a and 185b, and receive data voltages from the first and second drain electrodes 175a and 175b. At this time, the edges of the first to fourth openings 194a-194d distort the electric field, and form a horizontal component that determines an inclined direction of liquid crystal molecules 31. The horizontal component of the electric field is almost parallel to the edges the first to fourth minute branches 194a-194d. Accordingly, as shown in FIG. 6, the liquid crystal molecules 31 are inclined in the direction parallel to the length direction of the minute branches 194a-194d. The length directions in which the minute branches 194a-194d are extended in one pixel are all four directions such that the inclined directions of the liquid crystal molecules 30 are all four directions, and four domains including the different alignment directions of the liquid crystal molecules 31 are formed in the liquid crystal layer 3. The viewing angle of the liquid crystal display is widened by varying the inclined directions of the liquid crystal molecules.

As described above, the liquid crystal display according to an example embodiment increases the amount of the reaction initiator of the prepolymer material in the liquid crystal composition, and in detail, increases the content of the reaction initiator compared with the amount of the reactor propagating the polymerization of the prepolymer of the liquid crystal composition such that the circumference stain phenomenon that may be generated at the circumference portion of the liquid crystal may be improved.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

<Description of Symbols>

GL, 121: gate line  RL, 131: divided voltage reference voltage line
DL, 171: data line  Clca, Clcb: liquid crystal capacitor
Qa, Qb, Qc: switching element (thin film transistor)
110, 210: substrate  124a, 124b, 124c: gate electrode
140: gate insulating layer  154a, 154b, 154c, 157: semiconductor
163a, 165a, 163b, 165b, 163c, 165c: ohmic contact
173a, 173b, 173c: source electrode  175a, 175b, 175c: drain electrode
180p, 180q: passivation layer  191a, 191b: subpixel electrode
220: first light blocking member  230: color filter
330: second light blocking member
271a, 271b: opening

What is claimed is:

1. A liquid crystal display comprising:
a first substrate;
a plurality of pixel electrodes disposed on the first substrate and including a first subpixel electrode and a second subpixel electrode including a cross stem and a plurality of minute branches extending from the cross stem;
a second substrate facing the first substrate;
a first alignment layer disposed on the first substrate and the pixel electrode;
a second alignment layer disposed on an inner surface of the second substrate; and
a liquid crystal layer injected between the first substrate and the second substrate and including a prepolymer having a reaction initiator group and a polymerization reactor group, of which a content of the reaction initiator group is higher than a content of the polymerization reactor group.

2. The liquid crystal display of claim 1, wherein
the reaction initiator group has a function of initiating polymerization of the prepolymer.

3. The liquid crystal display of claim 2, wherein
the polymerization reactor group has a function of performing polymerization of the prepolymer in which the polymerization is initiated.

4. The liquid crystal display of claim 3, wherein
the prepolymer is a reactive mesogen.

5. The liquid crystal display of claim 4, wherein
the reaction initiator group is an aryl ester group.

6. The liquid crystal display of claim 4, wherein
the polymerization reactor group is an acrylate group or a methacrylate group.

7. The liquid crystal display of claim 4, wherein
the prepolymer is 0.1-0.5 wt % of a total weight of the liquid crystal layer.

8. The liquid crystal display of claim 1, wherein
the pixel electrode is divided into four subregions by the cross stem.

9. The liquid crystal display of claim 8, wherein
the minute branches of each subregion extend in different directions.

10. The liquid crystal display of claim 9, wherein
the minute branches of the adjacent subregions are orthogonal.

11. The liquid crystal display of claim 9, wherein
a width of the minute branches is in a range of 2.5 µm to 5.0 µm.

12. The liquid crystal display of claim 11, wherein
the width of the minute branches becomes wider closer to the cross stem.

13. The liquid crystal display of claim 12, wherein
a difference between a portion where the width of the minute branches is wide and a portion where the width is narrow is 0.2 µm to 1.5 µm.

14. A method manufacturing a liquid crystal display, comprising:
forming a plurality of pixel electrodes including a first subpixel electrode and a second subpixel electrode formed with a cross stem and a plurality of minute branches extending from the cross stem on a first substrate;
forming a second substrate facing the first substrate;
forming a first alignment layer on the first substrate;
forming a second alignment layer on the second substrate;
injecting a liquid crystal layer including a prepolymer having a reaction initiator group and a polymerization reactor group, in which a content of a reaction initiator group is higher than that of a polymerization reactor group in a total liquid crystal composition between the first substrate and the second substrate;
applying an electric field to the pixel electrode and the common electrode; and
irradiating the liquid crystal layer with light to transform the prepolymer into a polymer.

15. The method of claim 14, wherein
the reaction initiator group has a function of initiating polymerization of the prepolymer.

16. The method of claim 15, wherein
the polymerization reactor group has a function of performing the polymerization of the prepolymer in which the polymerization is initiated.

17. The method of claim 16, wherein
the prepolymer is a reactive mesogen.

18. The method of claim 17, wherein
the reaction initiator group is an aryl ester group.

19. The method of claim 17, wherein
the polymerization reactor group is an acrylate group or a methacrylate group.

20. The method of claim 17, wherein
the prepolymer is 0.1-0.5 wt % of a total weight of the liquid crystal composition.

* * * * *